(12) United States Patent
Falk et al.

(10) Patent No.: US 10,193,284 B2
(45) Date of Patent: Jan. 29, 2019

(54) DEVICE FOR ESTABLISHING A MULTI-PHASE ELECTRIC CONNECTION AND AN ARRANGEMENT COMPRISING CORRESPONDING DEVICES

(71) Applicant: SMA Solar Technology AG, Niestetal (DE)

(72) Inventors: Andreas Falk, Kassel (DE); Sebastian Umlauf, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/892,720

(22) Filed: Feb. 9, 2018

(65) Prior Publication Data
US 2018/0175572 A1 Jun. 21, 2018

Related U.S. Application Data

(63) Continuation of application No. PCT/EP2016/066579, filed on Jul. 13, 2016.

(30) Foreign Application Priority Data

Aug. 10, 2015 (DE) .......................... 10 2015 113 123

(51) Int. Cl.
*H01R 4/60* (2006.01)
*H01R 25/16* (2006.01)
(Continued)

(52) U.S. Cl.
CPC .......... *H01R 25/162* (2013.01); *H02G 5/002* (2013.01); *H02G 5/02* (2013.01); *H02B 1/20* (2013.01)

(58) Field of Classification Search
CPC ... H01R 4/02; H01R 4/04; H01R 4/60; H01R 25/162; H02G 5/02; H02G 5/002
(Continued)

(56) References Cited

U.S. PATENT DOCUMENTS 3,178,668 A 4/1965 Weimer et al.
3,325,588 A * 6/1967 Lear ...................... H01R 35/02
 174/32

(Continued)

FOREIGN PATENT DOCUMENTS

DE 29703525 U1 6/1998
DE 102012107751 A1 3/2014
DE 102013100955 A1 7/2014

OTHER PUBLICATIONS

International Search Report dated Oct. 11, 2016 for International Application PCT/EP2016/066579.

*Primary Examiner* — William H Mayo, III
(74) *Attorney, Agent, or Firm* — Eschweiler & Potashnik, LLC

(57) ABSTRACT

An apparatus for establishing a multi-phase electrical connection including at least one connecting element per phase, wherein each connecting element comprises two busbars and a number (N) of substantially identical, flexible conductors arranged in parallel with one another in a plane, said conductors electrically conductively connecting the two busbars. Further, a spacing (a) of geometric center points of cross sections of adjacent conductors from one another is at least twice as large as an equivalent diameter (d, $d_{equiv}$) of one of the conductors, and each busbar respectively comprises a connection region for electrical and mechanical connection of the connecting element to an electrical device. In addition, the connecting elements are arranged in parallel with one another and the geometric center points of the cross sections of adjacent conductors of adjacent connecting elements, which are assigned to different phases, have a spacing (b) from one another that is in each case at most half the product of the number (N) of electrical conductors minus 1 multiplied by the spacing (a) of the conductors of a phase from one another.

10 Claims, 4 Drawing Sheets

(51) Int. Cl.
*H02G 5/00* (2006.01)
*H02G 5/02* (2006.01)
*H02B 1/20* (2006.01)

(58) Field of Classification Search
USPC ............... 174/15.6, 93, 94; 439/487, 196
See application file for complete search history.

(56) References Cited

U.S. PATENT DOCUMENTS

| | | | | |
|---|---|---|---|---|
| 3,591,703 | A * | 7/1971 | Swenck | H01B 9/06 |
| | | | | 174/13 |
| 6,948,939 | B1 * | 9/2005 | Kogan | H01R 35/04 |
| | | | | 174/93 |
| 7,575,455 | B2 * | 8/2009 | Myatt | H02K 3/50 |
| | | | | 174/15.6 |
| 2010/0051342 | A1 | 3/2010 | Diaz | |

* cited by examiner

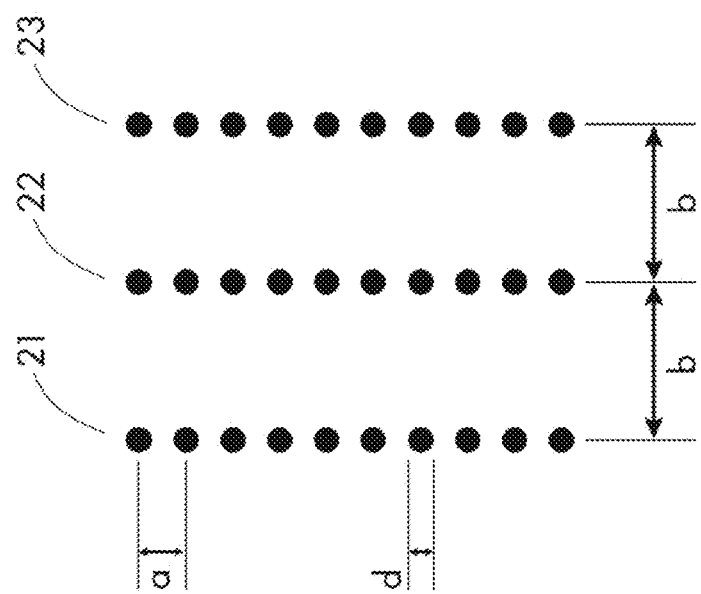

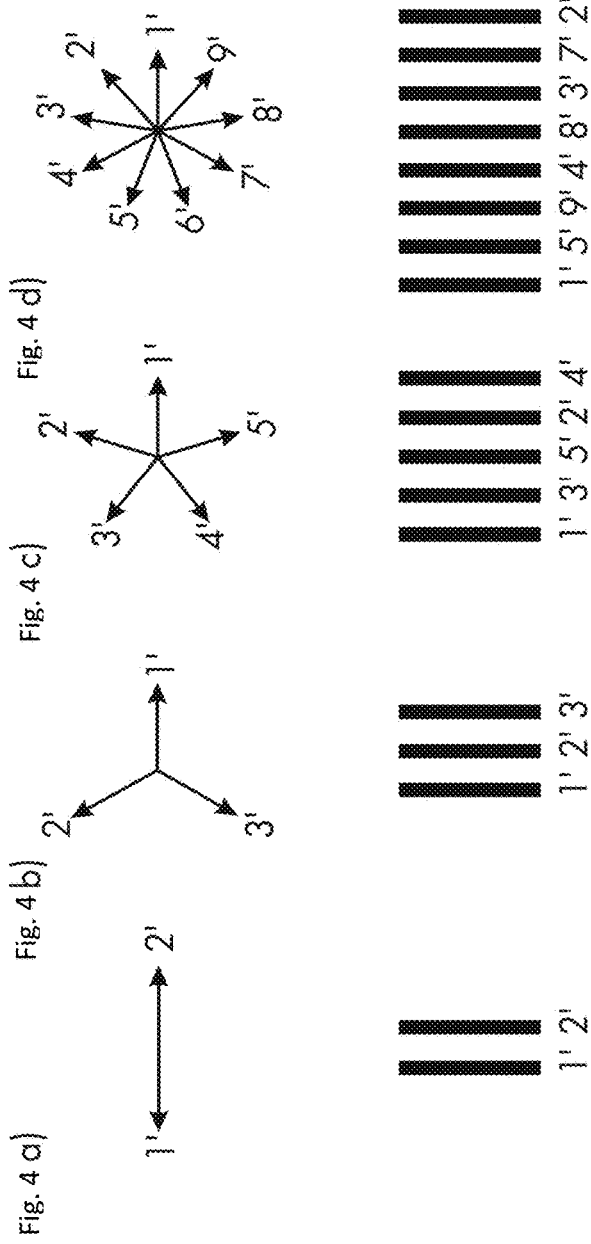

DEVICE FOR ESTABLISHING A MULTI-PHASE ELECTRIC CONNECTION AND AN ARRANGEMENT COMPRISING CORRESPONDING DEVICES

CROSS-REFERENCE TO RELATED APPLICATIONS

This application is a continuation of PCT Patent Application Number PCT/EP2016/066579, filed on Jul. 13, 2016, which claims priority to German Patent Application Number DE 10 2015 113 123.4, filed on Aug. 10, 2015, which are hereby incorporated by reference in their entirety.

FIELD

The disclosure relates to an apparatus for establishing a multi-phase electrical connection comprising at least one connecting element per phase and to an arrangement comprising corresponding apparatuses.

BACKGROUND

In electrical installations, as they comprise, for example, fuel cell applications, electric and hybrid vehicles or also photovoltaic plants, it is generally necessary to transmit electrical power between various components of said installations. Electrical connecting elements are used for this purpose. Various requirements play a role in the selection of suitable connecting elements. It is therefore necessary to also take into account, for example, mechanical requirements and possibly electrodynamic effects, in addition to the electrical power to be transmitted.

In order to transmit high powers, solid busbars, for example of copper or aluminum, are widely used. It is thus customary to also use busbars, for example, for connecting a multi-phase, often embodied as a three-phase, AC voltage output of an inverter to other electrical components of an electrical installation.

A common requirement of electrical connecting elements of this kind is for them to be capable of compensating for inaccuracies in the relative positioning of the components that are to be connected with respect to one another, hence to make a so-called tolerance compensation possible. This is not possible, or is only possible to a limited extent, using the solid busbars mentioned above. For this reason, mechanically flexible connecting elements are preferably used, which may consist of aluminum or copper braid, for example (cf. DE29703525U1, for example). These are often custom-made products that can cause correspondingly higher costs than would arise when using conventional materials.

In all the above-mentioned connecting elements, physical effects, such as what are known as the skin and proximity effects, can lead, when used in AC systems, to the current density within the connecting elements not being homogeneous, in contrast with DC systems. If, for example, in the case of a solid cylindrical conductor, the conductor diameter is substantially larger than the so-called penetration depth that results from the skin effect, in some circumstances, depending on the frequency, only one layer of the thickness of the penetration depth below the surface of the conductor carries the entire current. When using a plurality of conductors, the proximity effect leads to a further displacement effect as a result of eddy currents caused by the voltages induced by changing magnetic fields in adjacent conductors. In the case of conductors that are arranged in parallel and through which a current flows in the same direction, the superposition of the two effects causes the flow of current to be limited to an even smaller cross-sectional area of the conductor. The resulting AC resistance is accordingly high in comparison to the DC resistance. These effects and their consequences for the AC resistance of power cables are illustrated, for example, in R. Suchantke, H. Just, "Numerische Untersuchung des Wechselstromwiderstandes von Energiekabeln" [Numerical investigation of the AC resistance of power cables], TU Berlin, Field of theoretical electrical technology, PROJECT ELECTROMAGNETIC SIMULATION: AC RESISTANCE OF POWER CABLES, Mar. 13 2014.

Said displacement effects thus lead to losses on account of the resulting resistances and thus also lead to local thermal loading within the connecting elements. In this case, the order of magnitude of the loading depends, inter alia, on the frequency of the currents flowing through the connecting elements and on geometric factors, such as the diameter or the spacing of the connecting elements from one another.

In the annual report for 2011 from the Institute of Electrical Power Systems and High Voltage Engineering at the Technical University of Dresden, there is an article by R. Adam entitled "Untersuchungen zur Stromverdrängung in Sammelschienensystemen von Niederspannungs-Schaltgerätekombinationen (NS-SK)" [Investigations into current displacement in busbar systems of low-voltage switching device combinations (LV-SC)]. Said article contains results of a numerical simulation for current density distribution in busbars of a three-phase system that are arranged in parallel with respect to one another, taking into account skin and proximity effects. They show the non-homogeneous current distribution within a design having six busbars through which a three-phase current flows. It is possible to identify here, inter alia, an increased current density in the edge region of opposite busbars of different phases.

U.S. Pat. No. 3,178,668A indicates, inter alia, the possibilities for reducing the impedance in multi-phase energy transmission systems by way of a narrow spatial arrangement of busbars of individual phases.

US20100051342A1 proposes the arrangement of magnetic shields between busbars in order to reduce proximity effects caused by the current flowing through the busbars arranged in parallel.

The prior art contains various approaches to reduce the influence of the above-mentioned displacement effects by way of a suitable internal design of conductors or connecting elements or to reduce the material requirements of these elements, for example, by using hollow conductors (cf. DE10 2012107751A1, for example).

So-called Milliken conductors are therefore used in some applications. Said Milliken conductors are constructed from stranded, electrically isolated segments, which themselves consist of stranded individual wires. What this is intended to achieve as a result is that current of an equal magnitude flows through each individual wire and therefore the voltages induced by the current flows in the particular individual wires can be mutually compensated. The conductors are generally additionally encased by an isolation layer and a copper or aluminum shield (cf. DE102013100955A1, for example).

In addition, wire braids are also used as connecting elements, said wire braids having advantages with respect to busbars but also with respect to the mentioned Milliken conductors as seen from a mechanical point of view by way of their flexibility (cf. DE29703525U1, for example). By using wire braids of this kind, it is possible at the most to reduce the inhomogeneity of the current distribution within the connecting elements caused by the above-described displacement effects. The conventionally used aluminum or copper braids are usually custom-made products that cause correspondingly higher costs than would be the case when using conventional materials.

SUMMARY

The present disclosure is directed to an apparatus for establishing a multi-phase electrical connection and an arrangement comprising a corresponding apparatus, wherein the apparatus is constructed from commercially available conductors and in which the most homogeneous current density distribution possible within the apparatus is achieved, in order to prevent regions within the apparatus from being thermally overloaded on account of locally increased power loss.

In an apparatus according to the disclosure for establishing a multi-phase electrical connection comprising at least one connecting element per phase, each connecting element comprises two busbars and a number N of identical, flexible conductors arranged in parallel in a plane, said conductors electrically conductively connecting the two busbars. A spacing (a) of geometric center points of cross sections of adjacent conductors from one another is at least twice as large as an equivalent diameter (d) of one of said conductors. The following condition 1 therefore holds true:

$$a \geq 2d$$

If cables with a non-circular cross section are used, the above relationship can be applied by virtue of the fact that an equivalent diameter $d_{equiv}$ is used instead of the diameter d for such a conductor having a cross-sectional area A:

$$d_{equiv} = 2 * \sqrt{\frac{A}{\pi}}$$

Each busbar respectively comprises a connection region for electrical and mechanical connection of the connecting element to electrical busbars of an electrical device. Those connecting elements that transmit current of different phases, are arranged in parallel with one another and a spacing (b) of the geometric center points of the cross sections of adjacent conductors of adjacent connecting elements from one another is in each case at most half the product of the number of electrical conductors minus 1 multiplied by the spacing (a) of the conductors of a phase from one another. This second condition can be expressed using the following formula (condition 2):

$$b \leq \frac{1}{2}(N-1)a$$

An apparatus of this kind can be used, for example, to establish an electrically conductive connection between busbars of a three-phase AC output of an inverter and those of a low-voltage input of a transformer. Complex superposition of the individual displacement effects takes place in the conductors of an apparatus according to the disclosure. On the one hand, the skin effect within the individual conductors leads to displacement of the current to the outer region of the individual conductors. Current displacement to opposite regions takes place between the conductors of a connecting element of a phase on account of the proximity effect. By an arrangement of the connecting elements of the apparatus, which transmit current of other relative phase positions, at a distance that is defined in accordance with condition 2, the current density is increased, in particular in conductors of different phases facing each other. This effect is particularly highly pronounced when the phase difference is close to 180°. As a result, said superposition of the individual effects leads to a more homogeneous current density distribution within the individual conductors. In this way, almost the entire conductor cross section is available for current transport and connecting elements that are cost-effective in comparison with conventional solutions can thus be realized.

The usually undesirable consequences of the already mentioned skin and proximity effects on the current density distribution within an apparatus for establishing a multi-phase electrical connection are facilitated by the disclosure in order to achieve a partial compensation with regard to the current displacement within the apparatus by way of an advantageous superposition of the two effects that is caused by the design of the apparatus. In this way, a substantially more homogeneous current density distribution within the apparatus is produced. It is thus possible to realize apparatuses for establishing a multi-phase electrical connection, which have a very simple design and a low material requirement and hence can be realized in a cost-effective manner in comparison to the solutions known from the prior art.

In one embodiment of an apparatus according to the disclosure for establishing a multi-phase electrical connection, the diameter of the conductors is smaller than or equal to the penetration depth that results on account of the skin effect. In this case, the penetration depth is dependent on both the frequency and on the electrical conductivity and the permeability of the material.

The individual conductors can be fixed to the busbars in a variety of ways. In an apparatus according to the disclosure, therefore, the conductors are fixed to the busbars with the aid of cable lugs, for example. In an alternative embodiment, the conductors are pressed or cold-welded individually to the busbars for the purpose of electrical contact-connection.

In one embodiment according to the disclosure of the apparatus, electrically isolating spacers are arranged between the conductors of a connecting element for the purpose of mechanically fixing the position of the conductors. In addition or alternatively, in another embodiment of the apparatus, electrically isolating spacers are arranged between adjacent connecting elements in order to absorb forces arising between the connecting elements for example in the event of short circuits arising and/or in the event of heating.

In a further embodiment of an apparatus according to the disclosure, the conductors of the connecting elements and/or the entire apparatus are/is molded. In this case, it is possible to use different electrically isolating potting compounds, which have different mechanical properties, for example depending on the area of use, in order to obtain, for example, the mechanical flexibility of the connecting elements or of the apparatus, said flexibility being required for tolerance compensation when connecting two electrical devices. Alternatively, the apparatus can also be molded only after establishment of the connection of two electrical devices. In this case, the apparatus could also be formed in a rigid manner after molding.

Furthermore, one embodiment of an apparatus according to the disclosure for establishing a multi-phase electrical connection makes provision for each of the conductors to be provided with an electrically isolating sheath, for example of rubber, PVC or TPE.

In an arrangement according to the disclosure of electrical busbars of electrical devices, which are connected by one of the apparatuses described above, the connecting elements are connected to the busbars of the electrical devices in such a way that no adjacent connecting elements are assigned to the same phase.

In a further arrangement according to the disclosure, the connecting elements are arranged in such a way that a deviation between a phase difference of the current through two adjacent connecting elements and 180° is minimal.

BRIEF DESCRIPTION OF THE DRAWINGS

In the following text, the disclosure is illustrated with the aid of figures, in which

FIG. 3 schematically shows a section through an apparatus designed in a three-phase manner in the region of the conductors; and FIGS. 4a to 4d show current vector illustrations, showing in each case the position of the phases of the currents with respect to one another in different systems.

DETAILED DESCRIPTION

Figure 1:
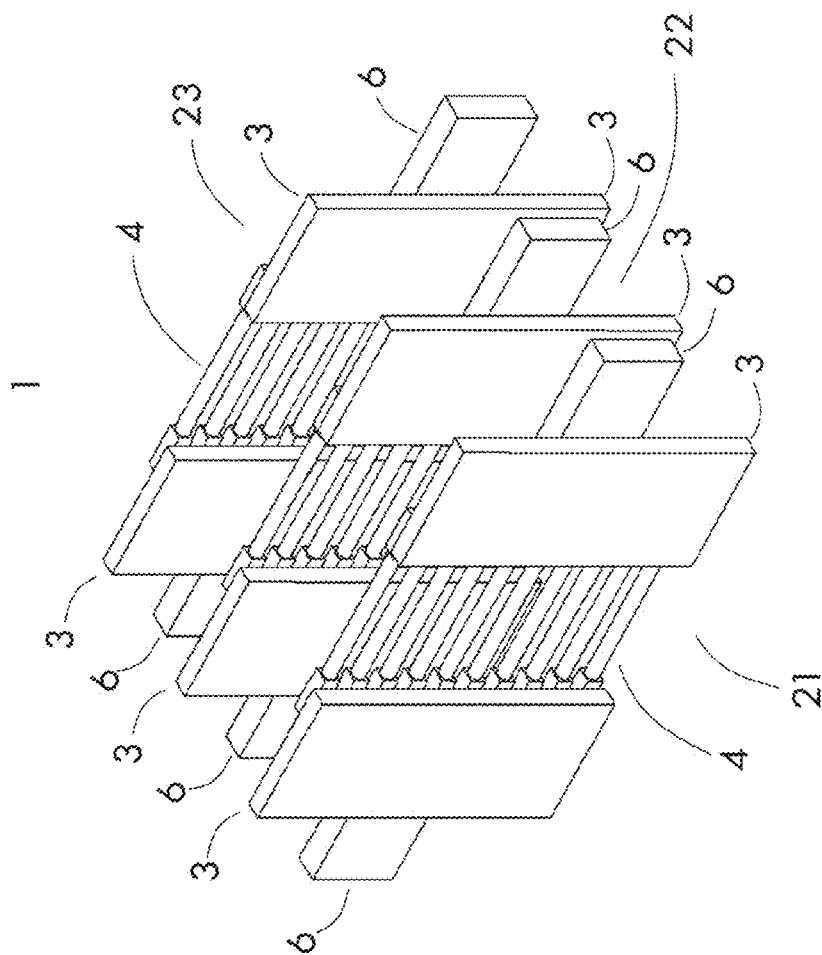
FIG. 1 shows a three-phase embodiment according to the disclosure of an apparatus 1 for transmitting three-phase current.

FIG. 1 shows a three-phase embodiment according to the disclosure of an apparatus 1 for transmitting three-phase current. In the illustrated case, the apparatus 1 respectively comprises one connecting element 2 per phase, wherein the two busbars 3 of the connecting elements 2 are electrically conductively connected to one another by ten conductors 4 in each case. The conductors 4 of a connecting element are arranged in parallel with one another and are identical in terms of their material and their geometry. In the illustrated embodiment, the individual conductors 4 are fixed to the corresponding busbars 3 with the aid of cable lugs 7. However, an alternative contact-connection of the conductors to the busbars, for example by means of pressing or welding, is also possible. In the case of the parallel arrangement of the connecting elements 2 with respect to one another, the spacing b is to be selected in accordance with condition 2. The electrical and mechanical connection of the individual connecting elements 2 to electrical busbars 6 of electrical devices are not shown in detail in the perspective illustrated in FIG. 1. The electrical devices are not illustrated for reasons of clarity.

Figure 2:
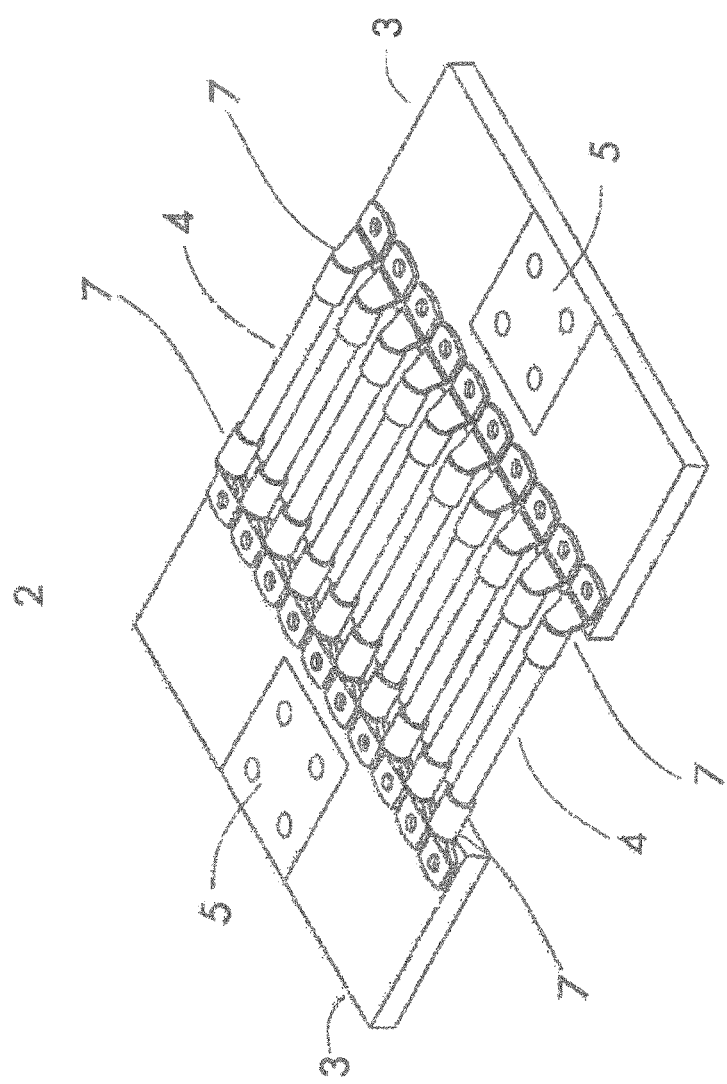
FIG. 2, which shows a perspective plan view of a connecting element from FIG. 1.

FIG. 2, which shows a perspective plan view of a connecting element 2 from FIG. 1, also illustrates, in addition to the busbars 3, the cable lugs 7 and the conductors 4, respectively a connection region 5 for electrical and mechanical connection of the connecting element 2 to electrical busbars 6 of electrical devices (not contained in this figure). Said connections of the busbars 3 to the busbars 6 of electrical devices in the regions of the connection regions 5 can be produced, for example, by screwing, riveting or welding. Here, the shape and the size of the connection regions 5, which are shown as square in FIG. 2, can vary according to external requirements.

FIG. 3 schematically shows a section through an apparatus 1 designed in a three-phase manner in the region of the conductors 4. Only the cross sections of the conductors 4 are illustrated here. Ten conductors 4 having a diameter d are also used again here per phase. Each of the conductors 4 of a connecting element 21, 22, 23 have a spacing a from one another and each of the three connecting elements 21, 22, 23 illustrated have a spacing b from one another. The two conditions a≥2 d and b≤½(N−1)a given further above are also satisfied.

The upper regions of each of FIGS. 4a to 4c show a current vector illustration, in which in each case the position of the phases of the currents with respect to one another in different systems is graphically indicated by the arrows used. The first case according to FIG. 4a is a two-phase system, in which the phase difference is 180°. FIG. 4b follows with a three-phase system having in each case a 120° phase difference. The arrangement of the subelements 3 with respect to one another is schematically given directly below the illustration of the phase position. For the FIGS. 4a and 4b an arrangement of the subelements 2 with respect to one another is not shown. In the two further examples of FIGS. 4c and 4d, which illustrate by way of example current-carrying systems having five and nine different phases, respectively, the arrangement of the connecting elements 2 with respect to the influence of the proximity effect on the current density distribution within the conductors 4 takes into account the fact that a deviation between a phase difference of the current through two adjacent connecting elements 2 and 180° is minimal. In the example illustrated in FIG. 4c, this results in an arrangement in which the phase difference of the current through two adjacent connecting elements 2 is in each case 144° when the connecting element 2 having the phase position 3' is arranged next to the connecting element 2 having the phase position 1'. In addition, the connecting elements 2 having the phase positions 5', 2' and then 4' follow. The case illustrated in the partial FIG. 4d proceeds in an entirely analogous manner, in which there is a phase difference of 40° between adjacent current vectors. In this case, in the arrangement of the nine connecting elements 2, the following sequence is selected with respect to the phase position: 1', 5', 9', 4', 8', 3', 7', 2', 6'. The phase difference of the currents through adjacent connecting elements 2 is therefore 160°.

What is claimed is:

1. An apparatus for establishing a multi-phase electrical connection, comprising:
   at least one connecting element per phase,
   wherein each connecting element comprises two busbars and a number (N) of substantially identical, flexible conductors arranged in parallel with one another in a plane, said conductors electrically conductively connecting the two busbars,
   wherein a spacing (a) of geometric center points of cross sections of adjacent conductors from one another is at least twice as large as an equivalent diameter (d, $d_{equiv}$) of one of the conductors,
   wherein each busbar respectively comprises a connection region for electrical and mechanical connection of the connecting element to an electrical device and wherein the connecting elements are arranged in parallel with one another and the geometric center points of the cross sections of adjacent conductors of adjacent connecting elements, which are assigned to different phases, have a spacing (b) from one another that is in each case at most half the product of the number (N) of electrical conductors minus 1 multiplied by the spacing (a) of the conductors of a phase from one another.

2. The apparatus as claimed in claim 1, wherein the diameter d of the conductors is smaller than or equal to a penetration depth δ that results on account of the skin effect.

3. The apparatus as claimed in claim 1, wherein the conductors are secured to the busbars with cable lugs.

4. The apparatus as claimed in claim 1, wherein the conductors are pressed or cold-welded individually to the busbars for the purpose of electrical contact-connection.

5. The apparatus as claimed in claim 1, further comprising electrically isolating spacers arranged between the conductors of a connecting element.

6. The apparatus as claimed in claim 1, further comprising electrically isolating spacers arranged between adjacent connecting elements.

7. The apparatus as claimed in claim 1, wherein the conductors of the connecting elements are molded.

8. The apparatus as claimed in claim 1, wherein each of the conductors are provided with an electrically isolating sheath comprising rubber, PVC or TPE.

9. An arrangement of electrical busbars of electrical devices, which are connected by an apparatus for establishing a multi-phase electrical connection, the apparatus comprising:
at least one connecting element per phase,
wherein each connecting element comprises two busbars and a number (N) of substantially identical, flexible conductors arranged in parallel with one another in a plane, said conductors electrically conductively connecting the two busbars,
wherein a spacing (a) of geometric center points of cross sections of adjacent conductors from one another is at least twice as large as an equivalent diameter (d, $d_{equiv}$) of one of the conductors,
wherein each busbar respectively comprises a connection region for electrical and mechanical connection of the connecting element to an electrical device and wherein the connecting elements are arranged in parallel with one another and the geometric center points of the cross sections of adjacent conductors of adjacent connecting elements, which are assigned to different phases, have a spacing (b) from one another that is in each case at most half the product of the number (N) of electrical conductors minus 1 multiplied by the spacing (a) of the conductors of a phase from one another,
wherein the connecting elements are connected to the busbars of the electrical devices such that no adjacent connecting elements are assigned to the same phase.

10. The arrangement as claimed in claim 9, wherein the connecting elements are arranged such that a deviation from a target phase difference between the current through two adjacent connecting elements of 180° is minimized.

* * * * *